United States Patent [19]

Kato et al.

[11] Patent Number: 5,069,313
[45] Date of Patent: Dec. 3, 1991

[54] DEVICE FOR PREVENTING DISLODGMENT OF DISC BRAKE PADS

[75] Inventors: Noboru Kato; Youichi Fujiwara, both of Nagoya, Japan

[73] Assignee: Nisshinbo Industries, Inc., Tokyo, Japan

[21] Appl. No.: 468,883

[22] Filed: Jan. 23, 1990

[30] Foreign Application Priority Data

Jan. 23, 1989 [JP] Japan .................... 1-11818

[51] Int. Cl.⁵ .......................................... F16D 55/224
[52] U.S. Cl. ................. 188/72.3; 188/73.31; 188/73.38
[58] Field of Search ............. 188/71.1, 72.3, 73.31, 188/73.36, 73.38, 73.39

[56] References Cited

U.S. PATENT DOCUMENTS

| 3,390,744 | 7/1968 | Fawick | 188/72.3 X |
| 4,506,767 | 3/1985 | Inoue et al. | 188/73.38 |
| 4,607,728 | 8/1986 | Kobayashi | 188/73.38 |

FOREIGN PATENT DOCUMENTS

| 282889 | 10/1965 | Australia | 188/73.38 |
| 46-42251 | 12/1971 | Japan . | |
| 28323 | 3/1981 | Japan | 188/72.3 |
| 56-104636 | 8/1981 | Japan . | |
| 56-104637 | 8/1981 | Japan . | |
| 57-61237 | 4/1982 | Japan . | |
| 144318 | 9/1982 | Japan | 188/73.31 |
| 58-39823 | 3/1983 | Japan . | |
| 63-8337 | 2/1988 | Japan . | |
| 63-30822 | 8/1988 | Japan . | |
| 1-7862 | 3/1989 | Japan . | |
| 1-144535 | 10/1989 | Japan . | |
| 1425269 | 2/1976 | United Kingdom | 188/73.38 |
| 2178807 | 2/1987 | United Kingdom | 188/73.38 |

Primary Examiner—George E. A. Halvosa
Attorney, Agent, or Firm—Young & Thompson

[57] ABSTRACT

A device prevents dislodgment of disc brake pads of a disc brake including a stationary member provided with rails for movably mounting the brake pads thereon and V-shaped retraction springs having legs urging the brake pads away from each other. The device includes central stoppers and end stoppers for limiting deformations of the retraction springs in axial directions of discs of the disc brake. The central stoppers are provided on an upper surface of the stationary member between the legs of the retraction springs. The end stoppers are provided on the upper surface of the stationary member on outer sides of the legs of the retraction springs. The central stoppers and the end stoppers may be provided on pad springs provided between the brake pads and the rails.

2 Claims, 5 Drawing Sheets

FIG_1
PRIOR ART

FIG_3 PRIOR ART

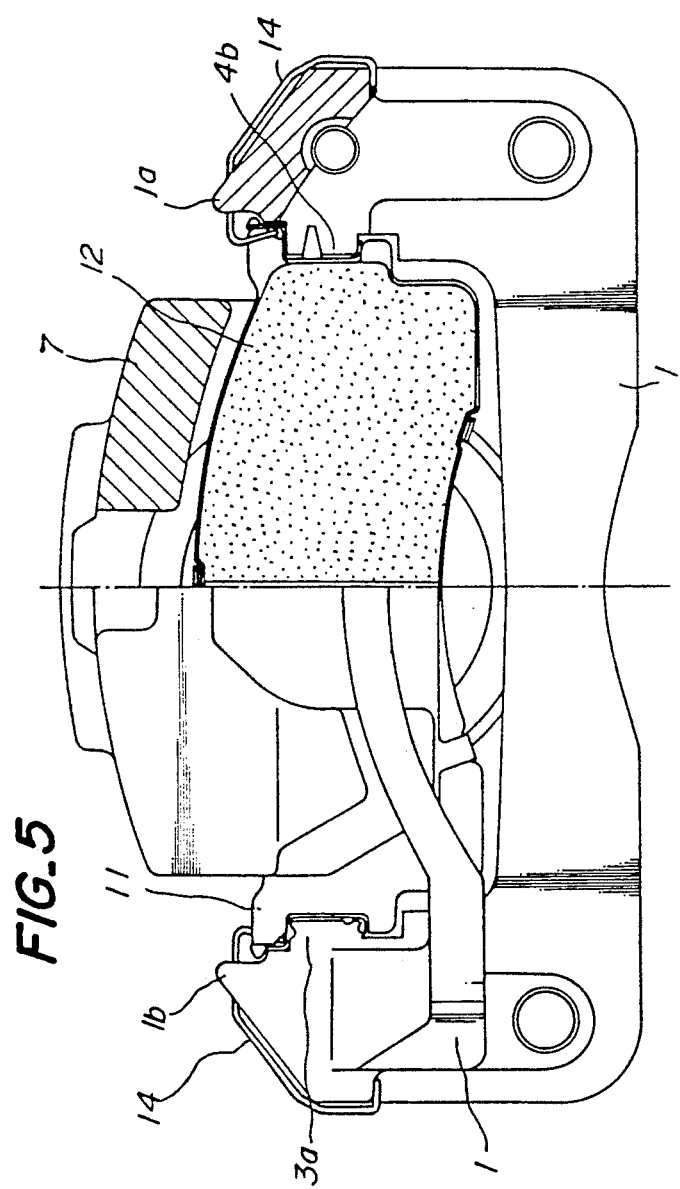
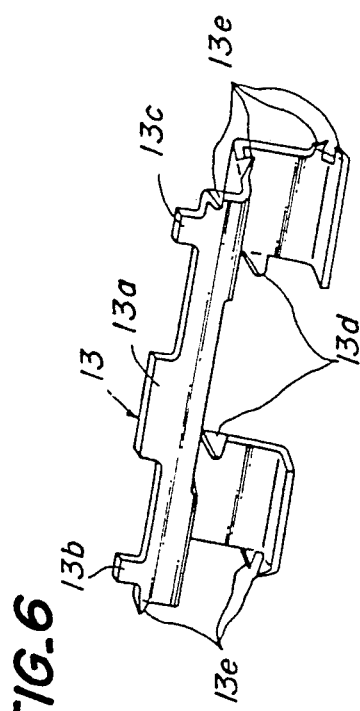
FIG.5
FIG.6

DEVICE FOR PREVENTING DISLODGMENT OF DISC BRAKE PADS

BACKGROUND OF THE INVENTION

This invention relates to a device for preventing brake pads from being dislodged from a disc brake.

FIGS. 1-3 illustrate one example of prior art disc brakes.

This disc brake includes a torque receiving member 1 as a stationary member having a disc receiving cavity 2 formed therein and rails 3a, 3b, 4a and 4b provided at four locations on inner surfaces of the disc receiving cavity 2. A guide pin 5 (FIG. 2) is provided on one side of the torque receiving member 1, and a guide pin 6 is provided on the other side of the member 1.

A caliper 7 is provided slidably relative to the guide pins 5 and 6 and includes an actuator portion 7a and a reaction portion 7b. The actuator 7a includes a piston 8 (FIG. 1) having a piston seal 9 and a dust seal 10.

The disc brake further includes a brake pad 11 guided by the rails 3a and 3b and a brake pad 12 in opposition to the brake pad 11 and guided by the rails 4a and 4b. Pad springs 13 (FIGS. 2 and 3) made of a stainless steel are arranged between the rails 3a and 4a and the brake pads 11 and 12 and between the rails 3b and 4b and the brake pads 11 and 12, respectively, and resiliently held by the rails 3a and 4a and the rails 3b and 4b, respectively for the purpose of preventing rust and noise and improving wear-resistance of these members.

Retraction springs 14 are provided in compressed condition between the brake pads 11 and 12 on both sides of the caliper 7, respectively, so as to move the brake pads 11 and 12 away from discs (not shown) when the brake is released, thereby preventing sliding sound of the sliding members and premature wear of the brake pads due to relative sliding movements.

An interposing member 15 made of a relatively elastic material is interposed between the brake pads 11 and 12 for preventing the brake pads 11 and 12 from falling into the disc receiving cavity 2 during transportation of the disc brake.

In the disc brake above described, the interposing member 15 is interposed between a pair of the brake pads 11 and 12 in order to prevent the brake pads 11 and 12 from falling into the disc receiving cavity 2 during transportation of the disc brake for incorporating it in a vehicle.

With this arrangement, however, mounting and dismounting operation of the interposing member 15 is troublesome. Moreover, interposing members 15 mounted in respective disc brakes are likely to be dislodged from the disc brakes during transportation and the dislodged interposing members are difficult to be collected or recovered to cause an economical disadvantage.

Moreover, there is a following difficulty when the brake pads 11 and 12 and the piston seal 9 are exchanged with new ones. Such an exchanging operation is effected after the one guide pin 6 has been removed and the caliper 7 has been rotated through some angles about the other guide pin 5. Under this condition, forces of the retraction springs 14 acting upon the brake pads 11 and 12 are not supported by any members, so that the brake pads 11 and 12 are forced outwardly to be dislodged from the rails. In order to avoid this, brake pads must be supported by at least one hand of an operator who is carrying out the above exchanging operation. As a result, the exchanging operation is very troublesome and time-consuming operation.

SUMMARY OF THE INVENTION

It is an object of the invention to provide a device for preventing dislodgment of disc brake pads, which eliminates all the disadvantages of the prior art and which is capable of supporting retraction springs by stoppers to prevent dislodgment of brake pads without supporting them by hands of an operator when assembling the brake or exchanging parts.

In order to accomplish the object, in a device for preventing dislodgment of a pair of brake pads of a disc brake including a stationary member provided with rails for movably mounting thereon the brake pads in opposition to each other and retraction springs urging the brake pads away from each other, the device according to the invention comprises stopper means for limiting deformations of the retraction springs in axial directions of discs of the disc brake.

The stopper means for limiting deformations of the retraction springs in axial directions of discs of the disc brake may be provided on the stationary member movably supporting the brake pads or on pad springs interposed between the pads and rails.

As above described, according to the invention the stoppers are provided for limiting excessive deformations of the retraction springs so that it is not needed to interpose a interposing member between brake pads as in the prior art even for transportation of a disc brake.

Moreover, the device according to the invention supports brake pads by retraction springs so as to prevent dislodgment of brake pads even when exchanging brake pads and piston seal with new ones, so that the brake pads need not be supported by hands of an operator, thereby facilitating the exchanging operation.

The invention will be more fully understood by referring to the following detailed specification and claims taken in connection with the appended drawings.

BRIEF DESCRIPTION OF THE DRAWINGS

FIG. 5 is a left side view taken along the line V—V—V—V in FIG. 4 viewed in directions shown by arrows; and FIG. 6 is a perspective view of a pad spring illustrating a second embodiment of the invention.

DETAILED EXPLANATION OF THE PREFERRED EMBODIMENTS

Figure 1:
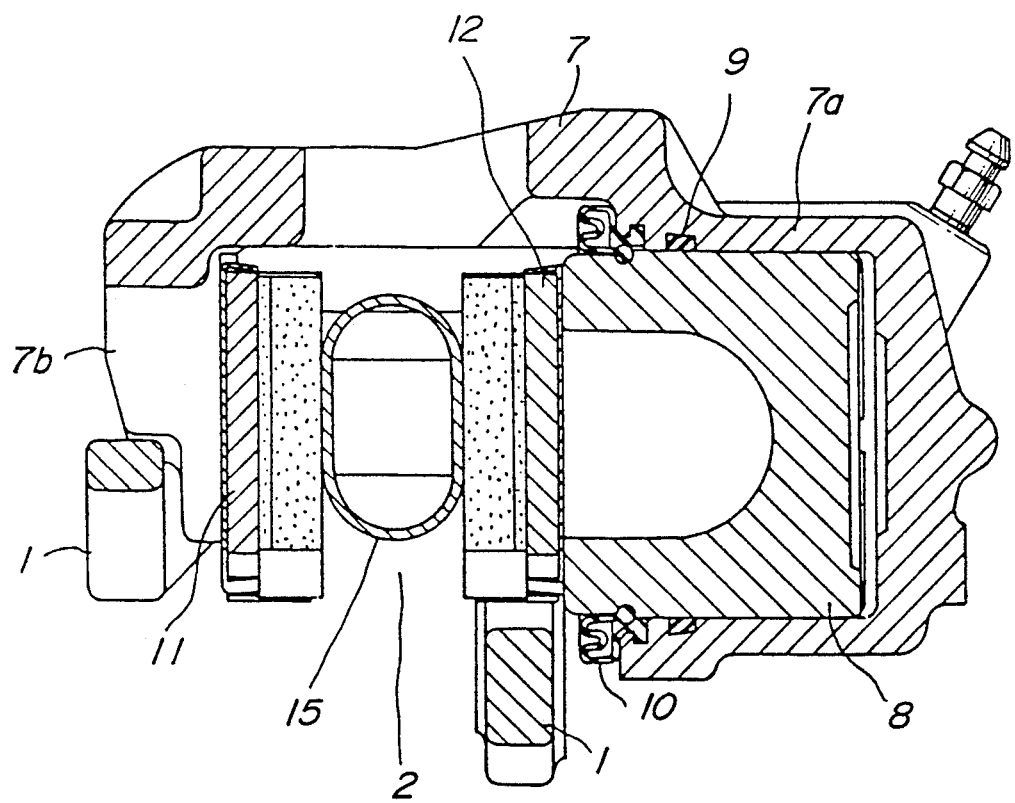
FIG. 1 is a longitudinal sectional view of a disc brake of the prior art.
Figure 2:
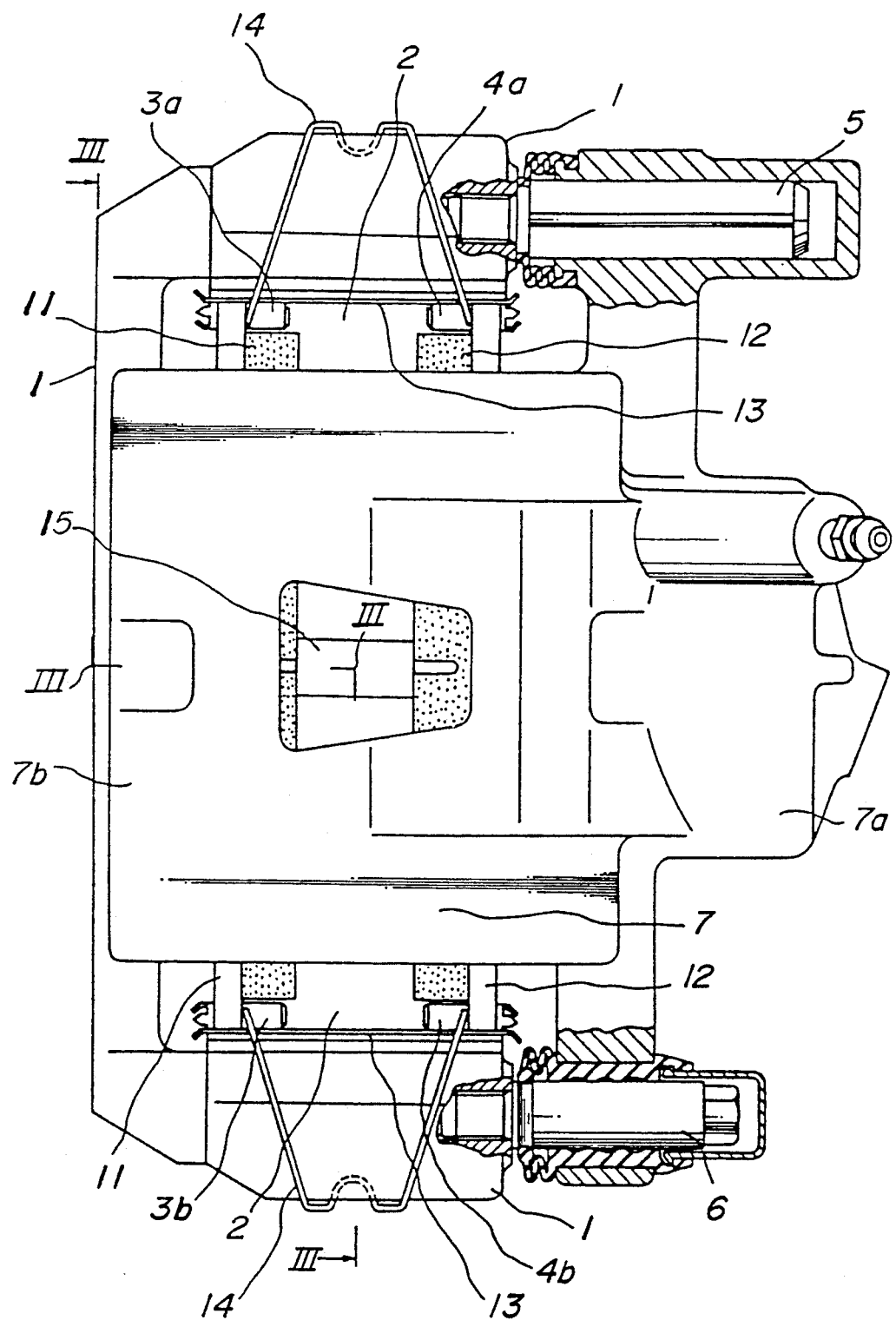
FIG. 2 is a plan view of the disc brake shown in FIG. 1.
Figure 3:
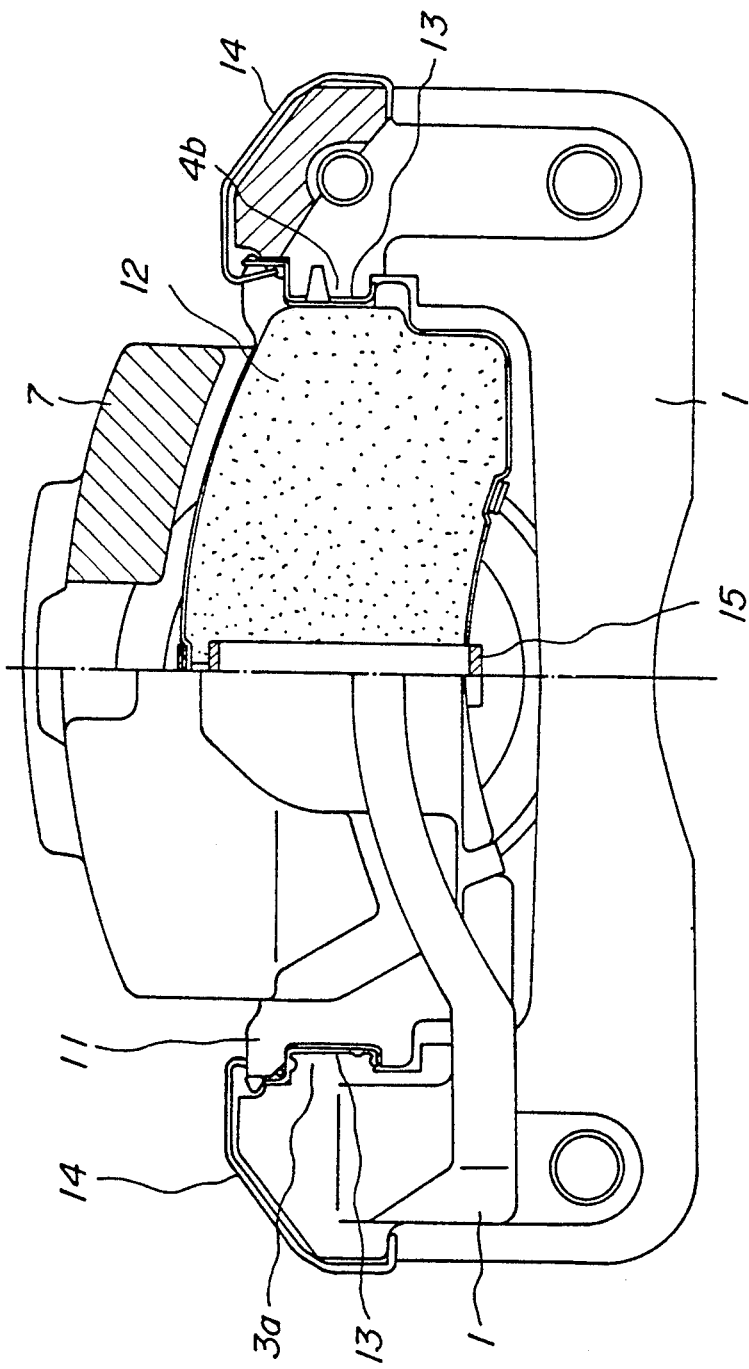
FIG. 3 is a left side view taken along the line III—III—III—III in FIG. 2 viewed in directions shown by arrows.
Figure 4:
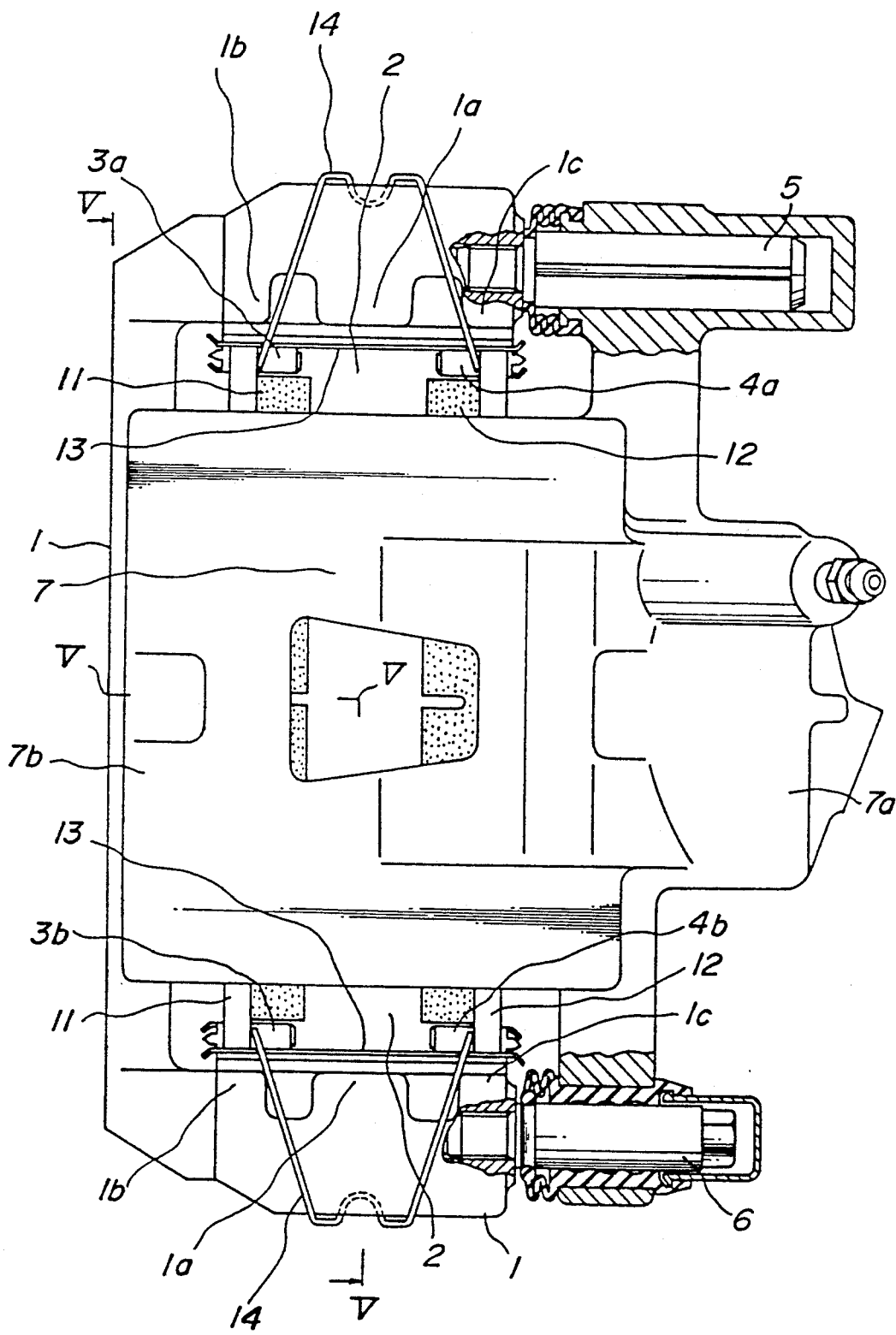
FIG. 4 is a plan view illustrating a disc brake of a first embodiment of the invention.

FIGS. 4-6 illustrate a first embodiment of the invention wherein like components are designated by the same reference numerals as those used in FIGS. 1-3.

According to the invention, in order to restrain excessive inward deformations of retraction springs 14, central stoppers 1a are provided on an upper surface of a torque receiving member 1 between legs of the retraction springs 14 which are substantially V-shaped in a plan view. Moreover, end stoppers 1b and 1c are provided on the upper surface of the torque receiving member 1 on outer sides of the legs of the retraction springs 14 in order to prevent excessive outward deformations of the retraction springs 14.

With this arrangement, the legs of the retraction springs 14 engage the central stoppers 1a to prevent excessive closing of the legs so as to restrain movements of the brake pads 11 and 12 toward each other, thereby preventing the brake pads 11 and 12 from falling into a disc receiving cavity 2.

On the other hand, the end stoppers 1b and 1c limit the excessive expansion of the retraction springs 14 to prevent the brake pads 11 and 12 from falling from rails 3a and 3b and 4a and 4b.

In the case that the disc receiving cavity 2 is not needed in view of a layout, the central stoppers 1a may be dispensed with. In another case, the end stoppers 1b and 1c may be dispensed with according to a layout.

FIG. 6 illustrates a second embodiment of the invention. In this embodiment, a torque receiving member 1 is not provided with any stoppers, but pad springs 13 are formed with stoppers.

In other words, in this embodiment each of the pad springs 13 is provided at a center on an upper edge with a central stopper 13a and at both ends with end stoppers 13b and 13c extending therefrom for limiting excessive deformations of the retraction spring 14 associated with the pad spring 13. The pad spring 13 is further provided with anchoring pawls 13d adapted to be resiliently fitted in the disc receiving cavity 2, and with guide pieces 13e for guiding the brake pads 11 and 12 when assembling them in the disc brake.

The operation of the disc brake of the second embodiment is similar to that of the first embodiment.

As can be seen from the above description, according to the invention the stoppers are provided in order to limit any excessive deformations of the retraction springs. As a result, an extra member such as the interposing member of the prior art interposed between the brake pads is not needed even in transporting the disc brake. It makes easy transportation of the disc brake and economically advantageous.

According to the invention, moreover, even when the brake pads and the piston seal are exchanged, the retraction springs support the brake pads to prevent their dislodgment. Therefore, the brake pads need not be supported by hands of an operator as in the prior art. Accordingly, the operation for assembling the brake or exchanging parts is very easy and its operation efficiency is considerably improved.

In the present invention, moreover, the disc brake having the device according to the invention is easily produced because the stoppers can be formed integrally with the torque receiving member or pad springs.

According to the invention, furthermore, cast materials of the torque receiving members or the pad springs can be commonly used for a disc brake having a disc receiving cavity and a disc brake having no disc receiving cavity. Therefore, the disc brake having the device according to the invention is advantageous for production.

While the invention has been particularly shown and described with reference to preferred embodiments thereof, it will be understood by those skilled in the art that the foregoing and other changes in form and details can be made therein without departing from the spirit and scope of the invention.

What is claimed is:

1. In a device for preventing dislodgment of a pair of brake pads of a disc brake including a stationary member provided with rails for movably mounting thereon the brake pads in opposition to each other and retraction springs each having two legs urging the brake pads away from each other; the improvement comprising a central stopper provided on an upper surface of the stationary member between the legs of the retraction springs and end stoppers provided on the upper surfaces of the stationary member on outer sides of the legs of the retraction spring to limit travel of the legs axially of the disc of the disc brake.

2. In a device for preventing dislodgment of a pair of brake pads of a disc brake including a stationary member provided with rails for movably mounting thereon the brake pads in opposition to each other and retraction springs each having two legs urging the brake pads away from each other, and pad springs arranged between the rails and the brake pads to prevent noise and reduce wear; the improvement comprising a central stopper provided at the center on an upper edge of the pad spring between the legs of the retraction spring and end stoppers provided on both ends of the upper edge of the pad spring on outer sides of the legs of the retraction spring to limit travel of said legs axially of the disc of the disc brake.

* * * * *